C. F. LEFEVER.
LIQUID GUN.
APPLICATION FILED MAR. 31, 1916.
1,186,212. Patented June 6, 1916.
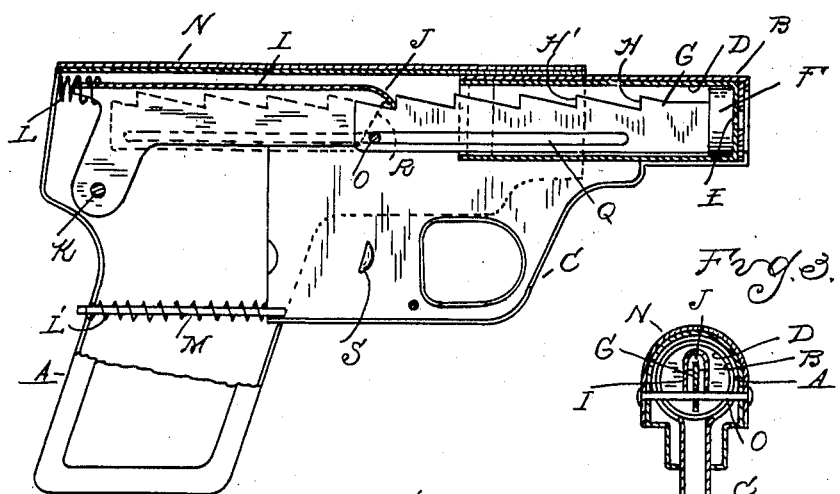
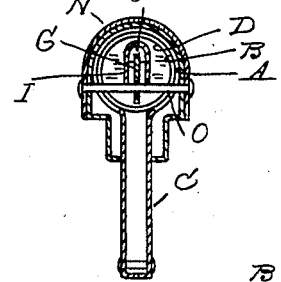
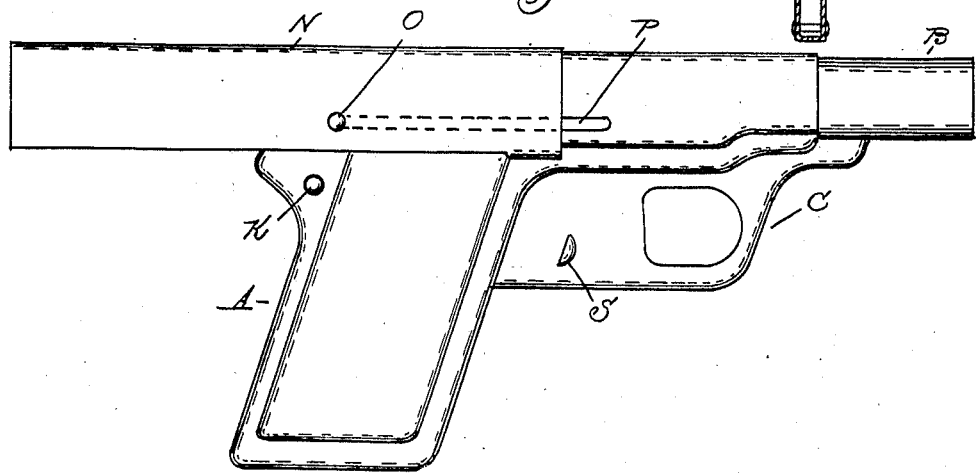
Inventor
Charles F. Lefever
By Whittemore Hulbert + Whittemore
Attorney

UNITED STATES PATENT OFFICE.

CHARLES F. LEFEVER, OF PLYMOUTH, MICHIGAN, ASSIGNOR TO DAISY MANUFACTURING COMPANY, OF PLYMOUTH, MICHIGAN, A CORPORATION OF MICHIGAN.

LIQUID-GUN.

1,186,212.     Specification of Letters Patent.     Patented June 6, 1916.

Application filed March 31, 1916.   Serial No. 87,946.

*To all whom it may concern:*

Be it known that I, CHARLES F. LEFEVER, a citizen of the United States of America, residing at Plymouth, in the county of Wayne and State of Michigan, have invented certain new and useful Improvements in Liquid-Guns, of which the following is a specification, reference being had therein to the accompanying drawings.

The invention relates to liquid guns of that type in which the liquid is discharged by the collapsing movement of telescopically-engaged barrel sections, and the present invention relates to the means employed for adapting the gun to firing a succession of shots.

In the drawings: Figure 1 is a longitudinal section through the gun; Fig. 2 is an elevation showing the manner of charging the gun; and Fig. 3 is a cross section.

A is the frame and handle section, preferably formed of a sheet-metal stamping, B is a barrel section telescopically engaging the frame, and C is a trigger section formed integral with the barrel and also telescopically engaging the frame.

As shown the barrel B is provided with an inner barrel or cylinder D, which at its forward end has a fine discharge aperture E for the ejection of the liquid. F is a piston engaging this barrel and having a rearwardly-extending shank G.

To adapt the gun for the firing of a succession of shots without re-loading, the piston F is adapted to be moved within the barrel step-by-step. To this end the shank G is provided with a series of notches H H' etc. adapted to successively engage a dog I mounted in the frame member. This dog is preferably a sheet-metal stamping of U-shaped cross section embracing the shank G, having at its forward end the pawl portion J for engaging the notches H H' etc., and at its rear end engaging a pivot K below the shank G.

L is a spring engaging a projection from the dog I and yieldably holding the same in engagement with the notches H.

L' is a spring engaging a guide M within the handle section and bearing against the trigger section C operating to normally hold said section in extended position.

For retracting the plunger F to load the barrel with liquid, I have provided an external sleeve member N having an operative engagement with the shank G and also adapted to release the dog I. The engagement of said sleeve N with the shank is formed by a cross pin O which passes through slots P in the opposite sides of the frame and also a slot Q in the shank G. The forward ends of the side portions of the dog I which embrace the shank G are inclined or cammed, as indicated at R, and the arrangement is such that when the sleeve N is drawn rearward the pin O engaging the cams R will first disengage the pawl J from the notches H and will then draw the shank G rearward, moving the piston F in the barrel and filling the latter with the liquid. When the sleeve N is moved forward the pin O, being withdrawn from the cams R, permits the pawl J to engage the rearmost of the notches H H' etc.

In operation, to load the gun the apertured end of the barrel is dipped into the liquid and the sleeve N is then drawn rearward, which as just described will retract the piston and fill the barrel. The sleeve is then moved forward and the gun is ready for use. Whenever the trigger section is retracted the barrel D is moved therewith, but the piston F is held from movement by engagement of the dog and pawl J with the notch in the shank G. Thus the liquid is ejected through the aperture E. Upon the completion of the rearward movement and the release of the trigger the spring M will again move the trigger and barrel forward, and as the piston is in frictional contact with the barrel it will also be carried forward therewith. This movement is permitted, as the dog I does not interfere with the forward movement of the shank but is merely moved relative thereto so as to engage another of the notches H. A second shot may then be fired by a similar movement of the trigger and so on until the piston is moved to the forward end of the cylinder.

To limit the movement of the trigger and barrel section so as to correspond with the distance between notches in the shank G, I have provided a stop preferably formed by a struck-out portion S on the side of the trigger section which engages the forward edge of the frame.

What I claim as my invention is:—

1. In a liquid gun, the combination with telescopically-engaged barrel and frame sections, of a piston in the barrel section, a notched shank projecting rearward from said piston, a dog secured to said frame section for successively engaging the notches of said shank, and means for retracting said piston in said barrel adapted to first release said dog.

2. In a gun, the combination with a frame section and telescopic barrel section, of a piston in said barrel, a notched shank for said piston, a dog mounted in said frame section for successively engaging the notches of said shank, a sleeve longitudinally adjustable upon said barrel, a pin connected to said sleeve extending through slots in said frame and having a lost-motion engagement with said shank, and a cam on said dog for engaging said pin to release said dog from the notch in said shank in advance of the movement of the latter.

3. In a gun, the combination with a frame and a barrel and trigger section telescopically engaging the same, of a piston in said barrel, a notched and slotted shank for said piston projecting rearward therefrom, a dog mounted in said frame engageable with the notches of said shank and having a cammed side portion adjacent to the side of said shank, a sleeve mounted on said frame and slidable longitudinally thereof, and a pin connected to said sleeve extending through slots in said frame and the slot in said shank, said pin also coöperating with a cam on said dog to release the latter in advance of movement of the shank.

4. The combination with a frame and a barrel and trigger section telescopically engaging the same, of a piston in said barrel, a shank for said piston extending rearward therefrom and provided with a series of notches, a dog mounted on said frame successively engageable with the notches of said shank, a sleeve longitudinally adjustable on said frame, a pin connected to said sleeve extending through slots in said frame into engagement with said shank and adapted upon the rearward movement of said sleeve to retract said shank and piston, and a cam on said dog engaging said pin in advance of the engagement thereof with said shank, said pin being withdrawn from said cam to release said dog upon the return movement of said sleeve.

5. In a gun, the combination with a frame section and a barrel and trigger section telescopically engaging the same, said sections being formed of sheet-metal stampings and said trigger section having parallel sides engaging a slot in the frame, of a piston in said barrel, a notched shank extending rearward from said piston, a dog embracing said shank for successively engaging the notches thereof, means for retracting said shank and piston to load the barrel, and a struck-out stop on said trigger section for limiting the movement thereof to correspond to the space between notches in said shank.

In testimony whereof I affix my signature in presence of two witnesses.

CHARLES F. LEFEVER.

Witnesses:
W. B. LOMBARD,
E. C. HOUGH.